United States Patent [19]
Buchbinder

[11] Patent Number: 5,577,155
[45] Date of Patent: Nov. 19, 1996

[54] RECTIFIER BASED MOTOR SPEED/BRAKE CONTROL

[76] Inventor: Carl Buchbinder, 49 Overhill Rd., East Brunswick, N.J. 08816

[21] Appl. No.: 162,665

[22] Filed: Dec. 3, 1993

[51] Int. Cl.⁶ ............................................. H02P 7/08
[52] U.S. Cl. ..................... 388/839; 388/856; 318/814; 318/380; 318/508
[58] Field of Search ..................... 363/62; 388/807, 388/824, 839–841, 851, 855, 856; 318/812–814, 504, 508–516, 380

[56] References Cited

U.S. PATENT DOCUMENTS

| | | | |
|---|---|---|---|
| 3,566,227 | 2/1971 | Edhlund | 318/380 X |
| 3,611,092 | 10/1971 | Wilmunder | 318/380 X |
| 3,924,169 | 12/1975 | Craft et al. | |
| 4,465,958 | 8/1984 | Roberts | |
| 4,506,198 | 3/1985 | Savas | |
| 4,751,440 | 6/1988 | Dang | |

*Primary Examiner*—Brian Sireus
*Attorney, Agent, or Firm*—Lawrence C. Edelman, Esq.

[57] ABSTRACT

A motor speed controller for use with dc motors, such as found in model (slot) cars, is provided by a plurality of pairs of oppositely-poled voltage-sensitive threshold conduction devices which are selectively connected so as to be controllably inserted between a source of operating voltage and the dc motor. In a preferred embodiment of the invention, the voltage-sensitive threshold conduction devices advantageously comprise a series connection of diode bridges which are sequentially included in the energizing path of the motor.

Furthermore, the controller provides a speed sensitive brake function by controllably connecting at least one voltage-sensitive threshold conduction device across the windings of the dc motor. When so connected, this allows the voltage generated by the spinning motor to cause the voltage-sensitive threshold conduction device to be conductive until the motor speed slows to the point that the generated voltage no longer causes the device to conduct. Thereafter, the motor is effectively "open circuited" and therefore allowed to rotate freely.

10 Claims, 2 Drawing Sheets

RECTIFIER BASED MOTOR SPEED/BRAKE CONTROL

BACKGROUND OF THE INVENTION

1. Field of the Invention

The present invention relates to the use of voltage sensitive threshold conduction devices for providing a motor speed/brake controller, and more particularly, in accordance with a first aspect of the invention, the use of such devices to provide a speed-sensitive brake portion for a DC motor controller. By connecting one or more of the devices across the windings of the motor, a variable setting of the speed at which the braking function ends is provided, thereby allowing the motor to be braked at speeds above a set point and to "coast" at speeds which are lower. In accordance with a second aspect of the invention, a series connection of a plurality of pairs of such devices, each pair having oppositely poled voltage threshold polarity, are selectively connected so as to be inserted between a source of power and the motor for providing the speed control portion of the controller. Such controllers are particularly useful for model (slot) cars.

2. Description of the Prior Art

Currently, DC motors such as those used in models commonly employ a variable resistor to control motor speed. This method is both simple to construct and operate and is functional. As shown in FIG. 1, a wiper 2 moves across the exposed windings of a resistor portion 4 to produce a variable resistor 6. Variable resistor 6 is connected in a series circuit with a DC motor 10 of a model and a power source 8 (via the metal tracks of a model racing system, not shown). The speed of the motor varies in accordance with the voltage divider created by the combination of the resistance of the DC motor and that portion of the variable resistor which is caused to be in the series circuit by the action of the wiper 2. Variable braking, when used, is accomplished by shunting the DC motor 10 with a portion of another variable resistor 12. Here, the variable resistor 12 operates in the same manner as resistor 6, however, the voltage for the series circuit is generated by the rotating armature of motor 10 instead of being supplied by the power source connected to the tracks. That is, when power is removed from a DC motor, it continues to spin because of its inertial mass. The armature, commutator and permanent magnets of the motor combine to act as an electrical generator and a generated voltage potential can be measured across its terminals as it spins. The polarity of the voltage, however, is such that a retarding electromotive force (EMF) is developed in motor 10, which slows down the speed of rotation of the rotating armature with a force related to the inverse of the variable resistance. This effect is commonly referred to as "dynamic braking".

One of the major drawbacks of the resistive type of speed controller is that the resistance of the DC motor and the variable resistor should be matched. Without a good match, an insufficient or otherwise inappropriate range of speed control will result. Another drawback is that the power rating of the resistor should vary with the resistance of the motor. In order to overcome these drawbacks and have the speed controller match the characteristics of a particular motor, one must either change the resistive element of the controller or have a different controller for each type of motor. Dealing with motors of different resistance is common in DC powered modeling and particularly in the "Slot Car" racing hobby. However, this is an undesirable situation. To become proficient at accurately controlling the speed of the model, you must develop a good "feel" for the controller/model combination. If you must be constantly switching among different controllers, or changing the resistive element depending upon the current motor in your model or the current model you happen to be using, it will be very difficult to develop a consistent "feel" for the controller or for the controller/model combination.

Furthermore, since the amount of speed control, as well as the braking, which one achieves with a given amount of wiper movement is non-linear, the "feel" of the speed controller will change, sometimes substantially, with a change in resistive element or motor. For example, for one resistive element you may have the top 50% of your speed control achieved by the upper 30% range of your wiper movement, while with a different resistive element in your controller, that same 50% speed control may only be achievable with the upper 10% of your wiper movement. The same situation happens when braking, and is therefore especially disadvantageous, since it results in applying a difficult to control non-linear braking effect to the model. This type of braking reduces the speed of the model in a way that is relatively difficult to control, thereby making it extremely difficult to developing a winning "feel" for controlling your model.

Additionally, since the resistance of a motor changes with its loading, resistive type speed controllers allow undesirable load responsive speed fluctuations (i.e., due to the loading increasing when the model is directed up an incline), making it even more difficult to develop a consistent "feel" for the controller.

A still further drawback of current speed controllers is the inability to predictably and accurately control a "release" of the braking function (deceleration, then coast), useful, for example, when controlling the model to rapidly negotiate tight turns.

It is an object of the present invention to provide a motor speed/brake controller which overcomes all of the above-discussed drawbacks in a manner which is simple, cost effective and reliable.

SUMMARY OF THE INVENTION

In accordance with a first aspect of the invention, a motor speed controller for use with dc motors, such as found in model (slot) cars, is provided by a plurality of pairs of oppositely-poled voltage-sensitive threshold conduction devices which are selectively connected so as to be controllably inserted between a source of operating voltage and a power input terminal of the dc motor. In a preferred embodiment of the invention, the voltage-sensitive threshold conduction devices advantageously comprise a series connection of diode bridges which are sequentially included in the energizing path of the motor.

In accordance with a second aspect of the invention, by controllably connecting at least one voltage-sensitive threshold conduction device across the windings of the dc motor, a speed-sensitive brake controller is provided.

In accordance with a preferred embodiment of the second aspect of the invention, the braking function is also provided by a diode bridge pairing arrangement, which arrangement selectively connects selected ones of a series connection of the diode pairs across the windings of the dc motor.

In a preferred embodiment of the invention, semiconductor diodes are provided in pairs connected in opposing polarity. A diode bridge semiconductor package of the type conventionally used as a full wave rectifier is ideally suited to provide the series connection of diode pairs, since no changes are required to the internal connections. One polarity of the source of operating voltage is coupled to a power input terminal of the motor, while the other polarity is connected to one end of the series connected diode bridges. A wiper arm completes the electrical circuit and selectively includes a selected number of the diode bridges in the energizing path to the motor by having one end connected to the other power input terminal of the motor and its other end movable to select any number of the series connected diode pairs. The use of diode pairs is particularly advantageous since the controller operation is then independent of the polarity of the voltage source and furthermore by the fact that the diodes are powered by the voltage source itself. That is, as will be explained in greater detail below, the operating voltage itself forward biases one diode of each diode bridge which is selectively included by the wiper in the motor energizing circuit. This forward biasing "drops" a fixed, linear amount of voltage (e.g., 0.7 volts) for each forward biased diode included by the wiper in the motor energizing circuit. This leaves less voltage for the motor, and therefore results in a stepwise linear decrease in the voltage applied for controlling the motor speed.

In accordance with a further aspect of the invention the opposed pairs of diodes are provided by readily available diode bridge inline packages.

In accordance with an even further aspect of the invention, a switching means is provided for allowing the user of the controller to selectively bypass one or more of the diode pairs, thereby changing the voltage range achievable with the remaining diode pairs, and thereby changing the "sensitivity" of the controller.

In accordance with a still further aspect of the invention, a user operable switch means is also provided in the braking circuit, for selectively bypassing at least one diode pair couplable across the motor windings during braking, thereby controlling the set point (speed) at which the brake function ends and the motor is allowed to spin freely.

For a fuller understanding of the present invention, reference should now be made to the following detailed description of the preferred embodiments of the invention, to the accompanying drawings and to the claims.

DETAILED DESCRIPTION OF THE INVENTION

Figure 1:
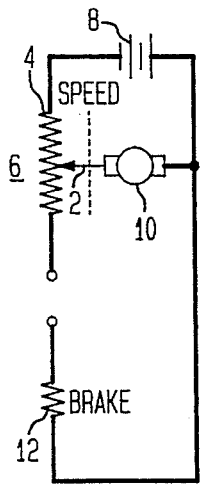
FIG. 1 illustrates a prior art resistor based speed/brake controller, already described.

FIG. 1, already described, illustrates a prior art resistor type speed/brake controller.

Figure 2:
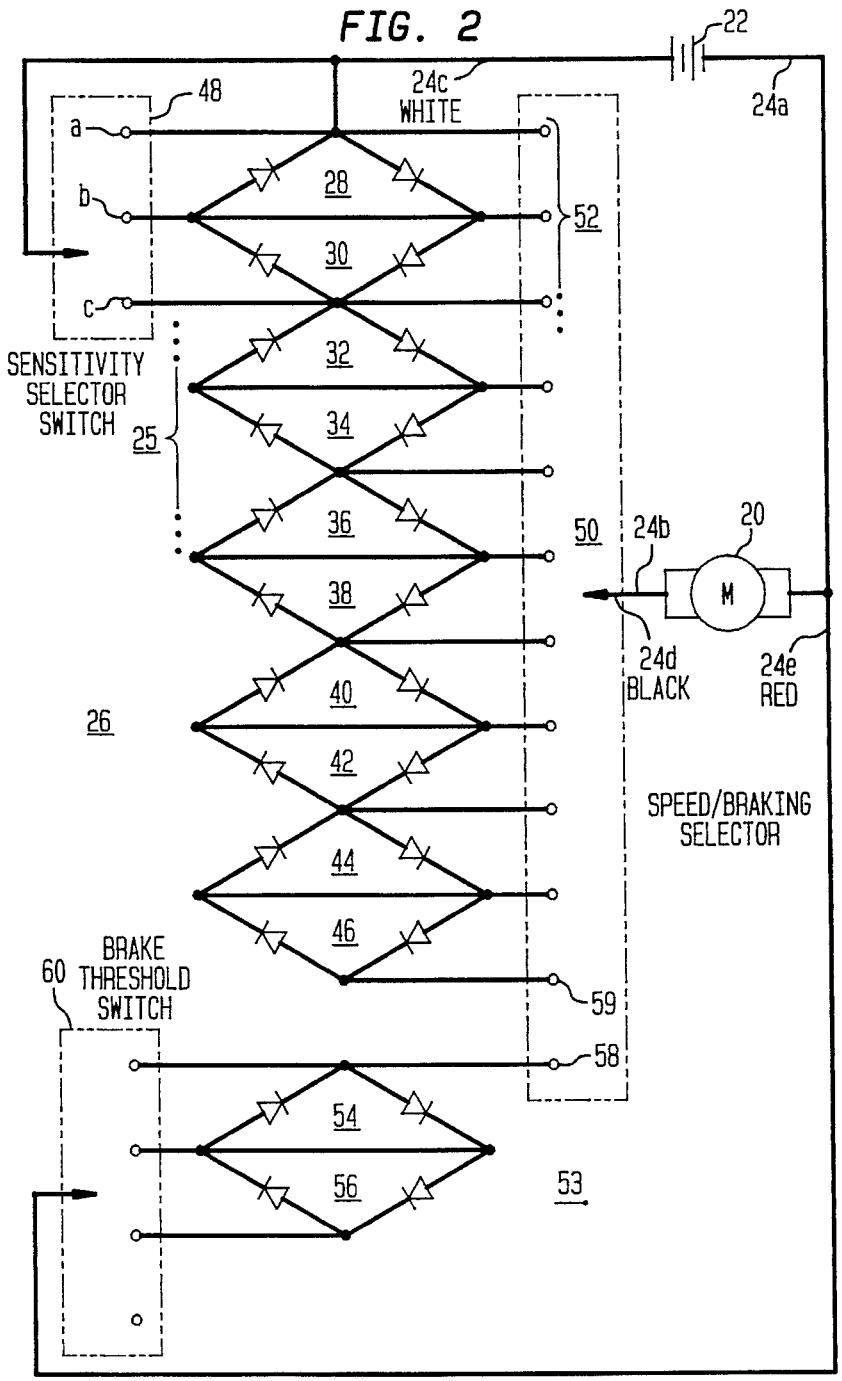
FIG. 2 illustrates in a simplified schematic diagram form a speed/brake controller constructed in accordance with the principles of the invention.

FIG. 2 illustrates in a simplified schematic diagram form a speed/brake controller constructed in accordance with the principles of the invention. A motor 20 is located in a model (not shown) and placed upon two electrically conductive tracks of a track system (also not shown). The track system has a voltage source 22 associated therewith, wherein one power input terminal (winding) of motor 20 is connected to one polarity of source 22 via one track (electrically indicated via a conductor 24a and the other track is connected with the other power input terminal of motor 20, electrically indicated via a conductor 24b. Three further electrical conductors, 24c, 24d and 24e are used to couple the motor power input terminals and the power source to a component circuit board (shown in dashed lines) of speed controller 26.

As shown in FIG. 2, a speed control portion 25 of the controller is formed using a lead 24c which is coupled to the top end of a series connection of oppositely poled diode pairs 28–46, mounted on the controller circuit board. A user operable sensitivity selector switch 48 has an input terminal also coupled to lead 24c, and its output terminal selectively connected to and operable to sequentially short together terminals 48a, 48b, and 48c.

Lead 24d connects the other power terminal of motor 20 (via e.g., a connection to the system track) to a wiper contact arrangement 50, which comprises, for example, a spring biased trigger having an end which slides across flat electrical terminals 52 (as well known) which are individually connected to respective ones of the series connection of diode pairs 28–46. This completes the speed control portion of controller 26.

The brake portion 53 of controller 26 comprises a series connection of oppositely-poled diode pairs 54 and 56, connected between an electrical contact 58 of wiper contact arrangement 50 and the other end of motor 20 via lead 24e. Also included in brake portion 53 is a second user operable switch 60 which provides a user setting for the threshold voltage which defines the point (speed) at which the brake, after being applied, becomes disengaged. Note, the arrangement of contacts 58 and 59, as well as the remainder of the contacts of arrangement 50, are positioned so that they are connected to lead 24d in an exclusive manner.

In operation, track system leads 24c, 24d and 24e are used to connect one end of power source 22 and both input terminals of motor 20 to controller 26. Typically, these leads are white, black and red, respectively. A spring (not shown) which is a portion of wiper contact arrangement 50, biases contact 50 so that it is normally positioned to make an electrical connection to terminal 58. At this position, no power is applied to motor 20 and the model is therefore not yet moving. As the contact arrangement 50 is moved (by the user pulling on the trigger) so as to travel up through diode contact terminals 52, an electrical motor energizing circuit is completed, comprising motor 20, power source 22 and as many pairs of the diodes as are connected between source 22 and the current position of contact 50 along diode contact terminals 52. Because the diode pairs are oppositely poled, the polarity of the track power source 22 is not important, and one diode of each pair will be conductive. For each conductive diode, a fixed amount of voltage will be dropped across its PN junction, e.g., 0.7 volts. Thus, if the contact is at the top terminal, the full voltage, e.g., 12 volts, will be applied across the power input terminals of motor 20, causing maximum speed of the model. However, for each diode contact terminal below the top terminal, 0.7 volts less than the power source 22 will be applied to the motor, causing a stepwise linear decrease in the voltage applied to control the speed of the model.

A user adjustable switch 48 can adjust the sensitivity of the controller by "shorting out" none, one, or two diode pairs, thereby causing the last contact 59 of the speed controller circuit portion to have 0.0, 0.7, or 1.4 volts more than it normally would have. This changes the feel of the controller from "soft" to "medium" to "aggressive".

When the trigger is moved so that connection is made to contact 58 (the brake contact terminal), one, both or neither of diode pairs 54 and 56 are shunted across the power input terminals of motor 20, depending upon the position of a user adjustable switch 60. When neither diode pair is connected across the power input terminals of motor 20, i.e., it's operated open circuited, no electrical load is applied to the terminals of motor 20 and the motor is allowed to spin freely. However, if diode pair 54 is caused to be in the motor braking circuit, one of its diodes will be forward biased if the motor is spinning fast enough to generate more than 0.7 volts. If that occurs, the conducting diode allows a back EMF to be developed in the motor, thereby causing the motor to slow down, i.e., brake, until the speed of the motor (and the model) drops below that necessary to generate the 0.7 volts to keep the diode forward biased (and then no longer present an electrical load to motor 20). If two of the diode pairs were caused by switch 60 to be in the brake circuit, the braking function would cease at a much higher speed, e.g., when the generated voltage falls below for example 1.4 volts for the two conducting diodes. Once the braking function ceases, due to the diodes no longer being forward biased (and then no longer present a load to motor 20), the motor circuit is effectively open circuited and the motor is allowed to rotate freely. This allows the user to initiate braking from a relatively high speed as a turn in the tracks is approached, yet allows a predictable "coasting" of the model after the model slows to a certain user selectable speed which the user feels is appropriate to safely negotiate the turn.

Figure 3:
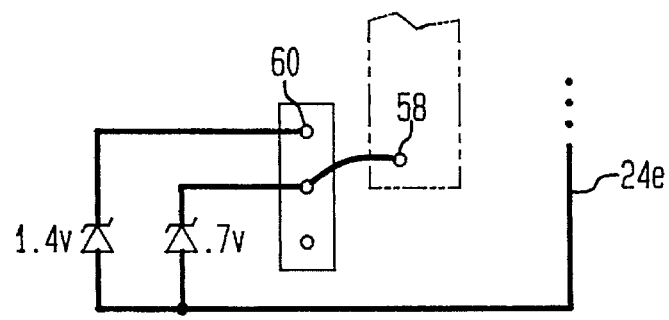
FIG. 3 illustrates in a simplified schematic diagram form an alternative construction for a portion of a speed/brake controller constructed in accordance with the principles of the invention.

An alternative, although not preferred embodiment of the invention, is shown in FIG. 3, wherein, for example, in the brake portion parallel connected zener diodes are used instead of series connected conventional PN diodes. One of the zeners begins conduction at 0.7 volts and the other at, for example, 1.4 volts. This provides the same threshold controlled braking function as in the preferred embodiment. However, the zeners are polarity sensitive, as compared with the oppositely poled diode pairs of the preferred embodiment, thereby making this embodiment less preferable.

Figure 4:
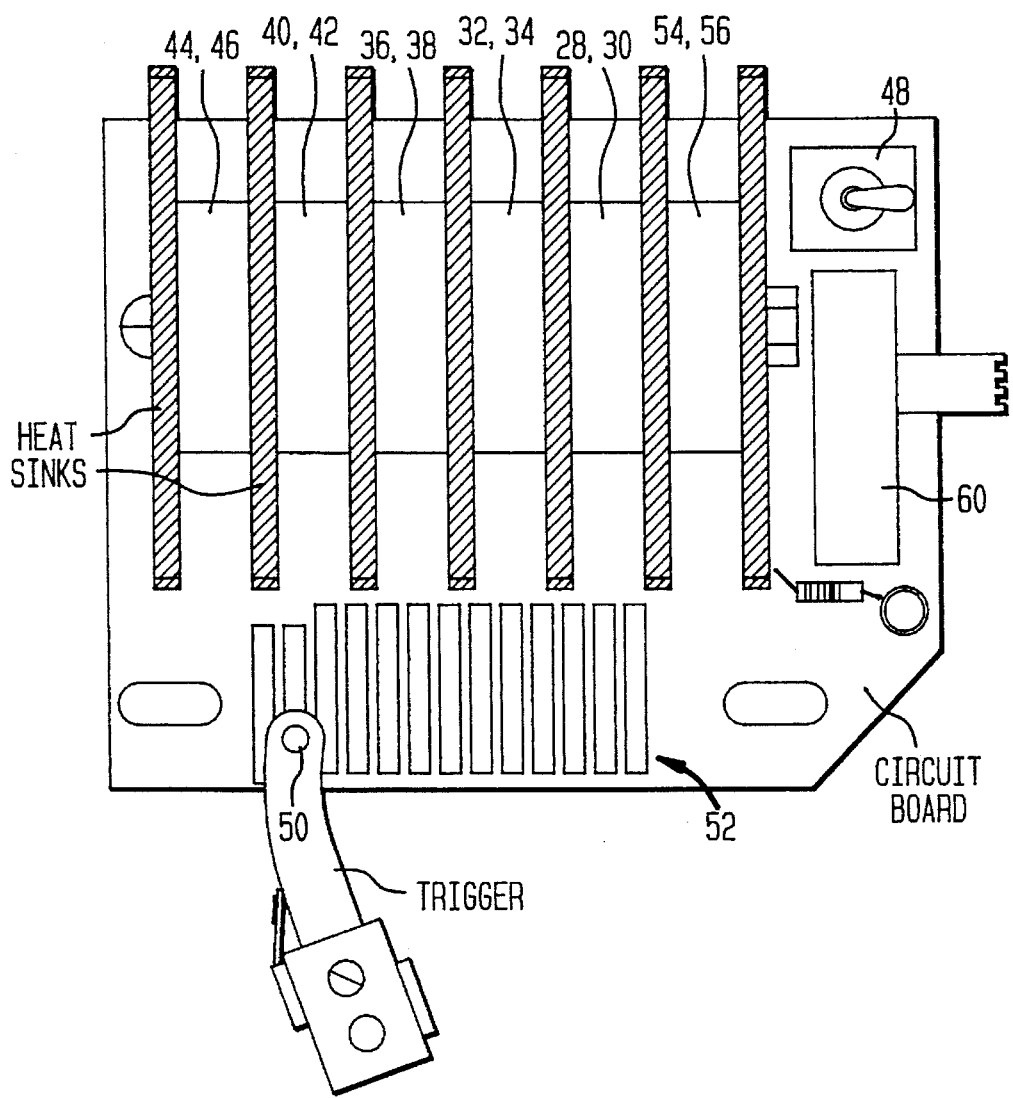
FIG. 4 illustrates a plan view of the novel speed/brake controller constructed on a printed circuit board accordance with the principles of the invention.

As previously noted in the Summary of the Invention, advantages provided by the invention include the use of relatively low cost and highly reliable semiconductor diode packages. Additionally, the form factor of diode bridge packages are such that they lend themselves to simple juxtaposition with alternating metal heat sinks, allowing a controller to be assembled as a very cohesive package on a small printed circuit board. FIG. 4 illustrates such an assembled controller circuit, wherein reference numerals used in FIG. 3 are used herein to denote similar components. The use of diode pairs is particularly advantageous since the controller operation is then independent of the polarity of the voltage source. The use of voltage threshold devices in the braking circuit applies braking only while the motor is spinning at relatively high speed. Once the motor slows down to a speed set by the user adjustable switch 60, no additional braking is provided, thereby allowing the model to roll through turns more freely and retain more speed through tight turns. Furthermore, since the controller operates on a voltage regulation principle, there is automatic matching to the motor resistance, as well as changes to the motor resistance due to, e.g., changes in motor loading. Furthermore, a user adjustable switch 48 is provided which changes in preset ways the range of the speed control, thereby changing its feel from "soft" to "aggressive". Although not noted earlier, the controller also provides, in effect, an "early braking" feature, in that it does not apply power to the motor when the speed control is set to a speed which is less than the current speed of the motor. Thus, the motor is allowed to coast and allow a slowing or braking of the model at a point in time which is earlier than the user application of the brake, resulting in smoother and better speed control as compared to the known prior art controllers.

Thus, although conventional PN diodes are used in the preferred embodiment, it should be understood that other types of threshold devices could also be used, such as the forenoted zener diodes or more complex threshold conduction circuit arrangements using, e.g., voltage comparator circuits.

Thus, there has been shown and described a novel motor speed brake controller which fulfills all the objects and advantages thereof. Many changes, modifications, variations and other uses and applications of the subject invention will, however, become apparent to those skilled in the art after considering this specification and its accompanying drawings which disclose preferred embodiments thereof. For example, instead of diode bridges being used, single diodes could be used, however, then the user must be careful to check the voltage polarity when connecting the controller to the track system. Furthermore, instead of using user adjustable switch 60, wiper contact arrangement 52 could be modified so as to provide additional contacts after contact 58, connected to the junctions between diode pairs 54,56 and after pair 56, so as to allow the user to control the threshold braking using the trigger. All such changes, modifications, variations and other uses and applications which do not depart from the spirit and scope of the invention are deemed to be covered by the invention which is limited only by the claims which follow.

What I claim is:

1. A motor speed controller for controllably coupling a source of electrical power to a motor, comprising:

a power input terminal adapted to be coupled to one polarity of a source of electrical power;

a series connection of a plurality of pairs of oppositely-poled semiconductor diodes, one end of said series connection being coupled to said power input terminal; and a first user controllable switching arrangement for selectively connecting one of a plurality of inputs to a single output; wherein respective sequential ones of said plurality of inputs are coupled to respective sequential points along said series connection of diode pairs corresponding to said one end and sequential junctions between said diode pairs which follow said one end, and said single output is adapted to be coupled to a speed control input terminal of a motor to be speed controlled.

2. The motor speed controller of claim 1, wherein:

said first user controllable switching arrangement comprises a trigger driven sliding contact.

3. The motor speed controller of claim 1, wherein:

adjacent pairs of said plurality of pairs of oppositely-poled semiconductor diodes comprise a single diode bridge arrangement formed in a single integrated circuit package.

4. The motor speed controller of claim 1, further including:

a second user controllable switching arrangement having a single input coupled to said power input terminal and a plurality of outputs, wherein sequential ones of said outputs are coupled to said one end of said series connection and at least two sequential junctions between said pairs of oppositely-poled semiconductor diodes which follow said one end, respectively.

5. The motor speed controller of claim 1, further including a threshold braking arrangement, comprising:

a second user controllable switching arrangement adapted for selectively connecting a voltage threshold conduction device across the windings of a motor to be speed controlled.

6. The motor speed controller of claim 5, wherein said first and second user controllable switching arrangements comprise a single, trigger driven, sliding contact arrangement.

7. A motor speed braking controller adapted to be selectively coupled across the windings of a DC motor for selectively braking its speed, comprising:

a first input terminal adapted to be selectively coupled to one end of said windings;

a second input terminal adapted to be selectively coupled to another end of said windings; and at least one pair of oppositely-poled semiconductor PN diodes connected between said first and second input terminals.

8. The motor speed controller of claim 7, further including:

a series connection of first and second pairs of said oppositely-poled diodes, and a user controllable switching arrangement for selectively connecting one or both of said diode pairs, or an open circuit, between said first and second input terminals.

9. The motor speed controller of claim 8, wherein:

said first and second pairs of oppositely-poled semiconductor diodes comprise a single diode bridge arrangement formed in a single integrated circuit package.

10. The motor speed controller of claim 7, wherein:

said at least one semiconductor diode comprises a plurality of zener diodes, each diode having a different threshold conduction voltage, and a user controllable switching arrangement for selectively connecting a different one of said zener diodes between said first and second terminals.

* * * * *